(12) United States Patent
Rodgers et al.

(10) Patent No.: US 8,156,345 B2
(45) Date of Patent: Apr. 10, 2012

(54) METHOD AND SYSTEM FOR MEMORY ATTACK PROTECTION TO ACHIEVE A SECURE INTERFACE

(75) Inventors: Stephane Rodgers, San Diego, CA (US); Xuemin Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/252,484

(22) Filed: Oct. 4, 2011

(65) Prior Publication Data

US 2012/0030391 A1    Feb. 2, 2012

Related U.S. Application Data

(63) Continuation of application No. 11/558,630, filed on Nov. 10, 2006, now Pat. No. 8,032,761.

(60) Provisional application No. 60/798,943, filed on May 9, 2006.

(51) Int. Cl.
*G06F 11/30* (2006.01)

(52) U.S. Cl. .................................. 713/189; 726/26

(58) Field of Classification Search .................. 713/189; 726/26
See application file for complete search history.

(56) References Cited

U.S. PATENT DOCUMENTS

| | | | |
|---|---|---|---|
| 5,003,593 A | 3/1991 | Mihm, Jr. | |
| 5,896,499 A | 4/1999 | McKelvey | |
| 6,158,004 A | 12/2000 | Mason et al. | |
| 6,363,444 B1 | 3/2002 | Platko et al. | |
| 6,795,905 B1 | 9/2004 | Ellison et al. | |
| 7,305,534 B2 | 12/2007 | Watt et al. | |
| 7,389,376 B2 | 6/2008 | Nakai | |
| 7,487,367 B2 | 2/2009 | Belnet et al. | |
| 7,634,585 B2 | 12/2009 | Conley et al. | |
| 2001/0052070 A1 | 12/2001 | Oishi et al. | |
| 2004/0039924 A1 | 2/2004 | Baldwin et al. | |
| 2004/0177261 A1 | 9/2004 | Watt et al. | |
| 2006/0129806 A1 | 6/2006 | Walmsley | |
| 2006/0161704 A1 | 7/2006 | Nystad et al. | |
| 2006/0174136 A1 | 8/2006 | Lyons et al. | |
| 2007/0056042 A1 | 3/2007 | Qawami et al. | |
| 2007/0106907 A1 | 5/2007 | Rainsard et al. | |
| 2007/0143601 A1 | 6/2007 | Arroyo et al. | |
| 2008/0104348 A1 | 5/2008 | Kabzinski et al. | |

FOREIGN PATENT DOCUMENTS

| | | |
|---|---|---|
| CN | 1215528 | 4/1999 |
| CN | 1647532 | 7/2005 |
| CN | 1694397 | 11/2005 |

*Primary Examiner* — Clifford Knoll
(74) *Attorney, Agent, or Firm* — Sterne, Kessler, Goldstein & Fox PLLC

(57) ABSTRACT

A slave device may receive commands from a host device communicatively coupled to the slave device, via a secure interface configured between the slave device and the host device over that coupling. An integrated memory within the slave device may be configured into a plurality of memory portions or regions based on the received commands. The memory regions may be utilized during operations associated with authentication of subsequent commands from the host device. A first memory region may enable storage of encrypted host commands and data. A second region may enable storage of decrypted host commands and data. A third region may enable storage of internal variables and/or intermediate results from operations performed by the slave device. Another region may comprise internal registers that enable storage of information only accessible to the slave device. Access to some of the memory regions may be controlled and/or restricted by the slave device.

20 Claims, 9 Drawing Sheets

METHOD AND SYSTEM FOR MEMORY ATTACK PROTECTION TO ACHIEVE A SECURE INTERFACE

CROSS-REFERENCE TO RELATED APPLICATIONS/INCORPORATION BY REFERENCE

This application is a continuation of U.S. patent application Ser. No. 11/558,630, filed on Nov. 10, 2006 (now U.S. Pat. No. 8,032,761), which makes reference to, claims priority to and claims benefit from U.S. Provisional Patent Application Ser. No. 60/798,943 filed on May 9, 2006.

This application also makes reference to:
U.S. application Ser. No. 11/558,662 filed on even date herewith; and
U.S. application Ser. No. 11/558,650 filed on even date herewith.

Each of the above stated applications is hereby incorporated by reference in its entirety.

FIELD OF THE INVENTION

Certain embodiments of the invention relate to securing information in multimedia systems. More specifically, certain embodiments of the invention relate to a method and system for memory attack protection to achieve a secure interface.

BACKGROUND OF THE INVENTION

In a multimedia system, such as a set-top box (STB), for example where multiple chips on a board communicate with each other, the security of the interfaces between these chips have to be considered in determining the overall security provided by the system. In particular, when one chip is a master device and another chip is a slave device, and when the communication between the master and slave devices occurs over an easily tapped or hijacked medium such as the PCI bus, for example, steps may need to be taken to ensure that the slave device may not be controlled by an unauthorized device. This may be especially important when, for example, the master or host device may be responsible for providing network conditional access (CA) decryption on video/audio data received by the multimedia system, and then re-encrypting the original data using a local copy-protection (CP) method before communicating the re-encrypted data to the slave device. In this instance, an unauthorized user may recover the video/audio data when the data communication between the host and slave devices is compromised. In this regard, an unauthorized user may attack the slave device instead of the higher security host device to recover the original video/audio data with the CA encryption removed.

In master-slave device configurations on a multimedia system board, for example, often the slave device has limited processing capabilities and may not be capable of providing a full software layer. In these instances, the host device may be utilized to configure the slave device via a plurality of commands sent over a generic interface, such as the PCI bus, for example. This may result in an additional level of exposure to unauthorized users since the slave device may not be capable of distinguishing when commands are being sent from the authorized host device or from an unauthorized host device. Without being able to make this distinction, the slave device may be configured by another device on the PCI bus, for example, regardless of the device's authorization status.

Authentication generally refers to the method by which the slave device may ensure that a command being sent to it comes from a legitimate or authorized host device. A slave device may be enabled to accept command from a single authorized device. A generally utilized approach for allowing the slave device to authenticate the host device is to use some sort of public key/private key protocol, where host commands may be signed using its private key, and which are then authenticated by the slave device using the public key. However, without a common shared secret, this type of authentication may be subject to a "man in the middle" attack, for example. In such an attack, a device on the common bus may write a public key to the slave device, where the public key may corresponds to the unauthorized device's own private key, and thus enable the unauthorized device to issue commands that may be considered "authenticated" by the slave device. Another problem with this approach is that the public/private key pair is common for all devices. Therefore, if the private key is ever compromised, it will compromise the devices that utilize this scheme.

Another level of security may include a common secret that may be utilized to provide authentication between devices. In this approach, the host device may encrypt commands that may somehow incorporate the common secret and the slave device may compare this value to its internally stored common secret to ensure that the command originates from an authorized source. However, while a common secret may be useful for helping to keep the details of key exchange secure, exposure of the common secret will compromise the devices.

Another approach may involve the use of a unique per device pair, sometimes known as "pairing", in order to ensure that for any given slave device there may a single master device. In many STB integrated circuits (ICs), an internal non-volatile memory, such as a one-time-programmable (OTP) or on-chip secure flash, for example, may be utilized to store secure root keys which may be unique for every chip. Utilizing this approach, both the host and slave devices may be programmed with the same secure root key. As a result, commands sent by the host device may be encrypted by, for example, some derivative of the secure root key. Since only a single master device has this key, the slave device may be assured that the command came from the single legitimate source.

However, "pairing" may have logistical and/or practical limitations. In most integrated circuit fabrication and assembly facilities, it may be very difficult to keep track of pairs of chips or devices throughout the manufacturing, validation, testing, and/or board mounting stages. In addition, different types of chips, as the host and slave devices generally are, may be manufactured separately, and a large amount of time and expense may be used to keep track of pairs of devices from two separate fabrication processes and/or sources in order to enable a "pairing" scheme.

Another type of exposure to unauthorized users faced by a slave device may be in the form of replay attacks. For example, when a particular command produces a desired result, an attacker that is tracking the system's activity may remember this command and may later issue the exact sequence in order to achieve the same result. In this regard, effectively reducing or eliminating the ability of unauthorized users to replay authorized command sequences in multimedia systems may enable secure communication interfaces between host and slave devices. Moreover, a slave device's internal memory may also be exposed to unauthorized users. Since intermediate results of encryption and/or decryption operations performed by the slave device may be stored in the internal memory, these intermediate results may be accessible to the unauthorized users.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for memory attack protection to achieve a secure interface, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for memory attack protection to achieve a secure interface. Aspects of the invention may comprise an integrated memory within a slave device that may be configured into a plurality of memory portions or regions by commands from a host device. The memory regions may be utilized during operations associated with authentication of subsequent commands from the host device. A first memory region may enable storage of encrypted host commands and data. A second region may enable storage of decrypted host commands and data. A third region may enable storage of internal variables and/or intermediate results from operations performed by the slave device. Another region may comprise internal registers that enable storage of information only accessible to the slave device. Access to some of the memory regions may be controlled by a bus controller and/or a memory interface integrated within the slave device.

In an embodiment of the invention, a master device and a slave device may be integrated circuits that may be mounted onto a single circuit board utilized in a set-top-box (STB) operation and/or in other similar applications, for example. The master or host device may be utilized to remove network conditional access (CA) decryption from the incoming data and to re-encrypt the data utilizing a different algorithm such as a local copy-protection (CP) method, for example. The decrypted/re-encrypted data may be communicated to the slave device via a PCI memory transfer and/or a dedicated serial interface, for example. In some instances, a mailbox command protocol may be utilized between the host and the slave devices over a PCI bus, for example, to send command and/or to configure at least a portion of the slave device. In this regard, the communication of data between the master or host device and the slave device may require that the mailbox communication scheme provide a secure exchange, for example, commands on this interface may require encryption and may utilize at least a first level of protection against replay attacks. When processing commands, the slave device may be able to authenticate the source of the commands to ensure that it is a legitimate device. Master keys may be utilized to create final session keys for commands and/or CP data encryption/decryption, for example. In this regard, a secure method of passing the master keys between the host and slave devices may be implemented. Moreover, to protect from rogue devices tapping into or snooping on the common bus, unauthorized devices may not be able to access the slave device's internal registers and/or access the slave device's private memory, such as DRAM memory, for example, to read clear intermediate data.

Figure 1:
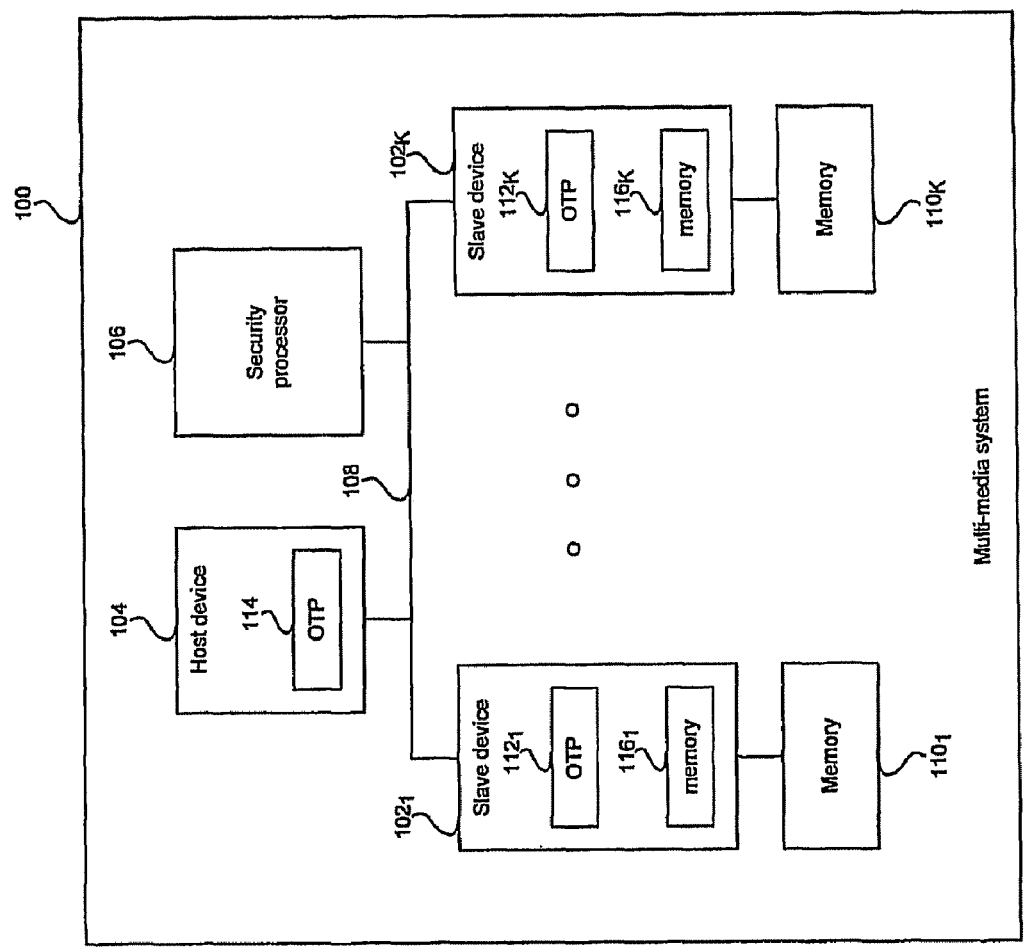
FIG. 1 is a block diagram illustrating an exemplary multimedia system, in accordance with an embodiment of the invention.

FIG. 1 is a block diagram illustrating an exemplary multimedia system, in accordance with an embodiment of the invention. Referring to FIG. 1, there is shown a multimedia system 100 that may comprise at least one slave device 102, a memory 110 associated with a slave device 102, a host device 104, a security processor 106, and a bus interface 108. The multimedia system 100 may be utilized in a set-top-box and/or other similar applications, for example. The bus interface 108 may be a PCI bus interface, for example. The slave device 102 may comprise a one-time-programmable memory 112 and an internal memory 116. The host device 104 may comprise a one-time-programmable memory 114. In an exemplary embodiment of the multimedia system 100 shown in FIG. 1, the multimedia system 100 may comprise a plurality of slave devices $102_1, \ldots, 102_K$ that may be utilized with associated memories $110_1, \ldots, 110_K$, and corresponding one-time-programmable memories $112_1, \ldots, 112_K$ and internal memories $116_1, \ldots, 116_K$. The host device 104, the slave devices $102_1, \ldots, 102_N$, the security processor 106, and/or the memories $110_1, \ldots, 110_K$ may be implemented as at least one integrated circuit (IC), for example.

The host device 104 may comprise suitable logic, circuitry, and/or code that may enable control and/or management of operations in the multimedia system 100. For example, the host device 104 may be utilized to generate and send commands to at least a portion of the components in the multimedia system 100 via a bus interface, such as the bus interface 108. In this regard, the host device 104 may also enable secure communication with at least a portion of the components in the multimedia system 100, such as the slave devices $102_1, \ldots, 102_K$, by utilizing command authentication schemes over the common bus interface. The host device 104 may support either or both an on-the-fly pairing command authentication operation and an automatic OTP key programming command authentication operation. The host device 104 may also support other secure operations such as key exchange, prevention of replay attacks, and/or prevention of memory attacks, for example. In this regard, the host device 104 may support the use of one or more of the command authentication operations, the key exchange, the prevention of replay attacks, and the prevention of memory attacks, for example, to enable a secure interface between the host device 104 and the slave devices $102_1, \ldots, 102_K$. The host OTP memory 114 within the host device 104 may comprise suitable logic, circuitry, and/or code that may enable storage of information that may be utilized for supporting command authentication operations.

The slave devices $102_1, \ldots, 102_K$ may each comprise suitable logic, circuitry, and/or code that may enable processing of audio and/or video data in the multimedia system 100. The slave devices $102_1, \ldots, 102_K$ may receive commands for processing audio and/or video data and may require some guarantee that the commands received originate from an authorized source. For example, when receiving commands from, for example, the host device 104, the slave devices $102_1, \ldots, 102_K$ may support authentication of the received commands based on either or both an on-the-fly pairing command authentication operation and an automatic OTP key programming command authentication operation. The slave devices $102_1, \ldots, 102_K$ may also support other secure operations such as key exchange, prevention of replay attacks, and/or prevention of memory attacks, for example. In this regard, the slave devices $102_1, \ldots, 102_K$ may support the use of one or more of the command authentication operations, the key exchange, the prevention of replay attacks, and the prevention of memory attacks, for example, to enable a secure interface between the host device 104 and the slave devices $102_1, \ldots, 102_K$. The slave OTP memories $112_1, \ldots, 112_K$ within the slave devices $102_1, \ldots, 102_K$ may comprise suitable logic, circuitry, and/or code that may enable storage of information that may be utilized for supporting command authentication operations. The internal memories $116_1, \ldots, 116_K$ integrated within the slave devices $102_1, \ldots, 102_K$ may comprise suitable logic, circuitry, and/or code that may enable storage of information, such as intermediate results, internal variables, host commands, and/or initialization information. Exemplary information may be utilized to support secure communication between the slave devices $102_1, \ldots, 102_K$ and the host device 104. Portions of the internal memories $116_1, \ldots, 116_K$ may comprise, for example, internal registers utilized by the slave devices $102_1, \ldots, 102_K$.

The memories $110_1, \ldots, 110_K$ may comprise suitable logic, circuitry, and/or code that may enable storage of data associated with the operations performed by the slave devices $102_1, \ldots, 102_K$. For example, for command authentication operations, the memories $110_1, \ldots, 110_K$ may be utilized for storage of data, such as encoding and/or decoding keys, for example, that may be utilized to authenticate that commands received by the slave devices $102_1, \ldots, 102_K$ were sent from an authorized source, such as the host device 104. In some instances, the memories $110_1, \ldots, 110_K$ may be portions of a single or multiple memory devices, such as a FLASH memory, for example. The memories $110_1, \ldots, 110_K$ may be utilized by the slave devices $102_1, \ldots, 102_K$ to support other secure operations such as key exchange, prevention of replay attacks, and/or prevention of memory attacks, for example, to enable a secure interface between the host device 104 and the slave devices $102_1, \ldots, 102_K$.

The security processor 106 may comprise suitable logic, circuitry, and/or code that may enable providing security operations to the multimedia system 100. For example, the security processor 106 may support command authentication operations to protect the data processed and the operations performed by the slave devices $102_1, \ldots, 102_K$ from being accessed by unauthorized sources. In this regard, the security processor 106 may support either or both an on-the-fly pairing command authentication operation and an automatic OTP key programming command authentication operation in the slave devices $102_1, \ldots, 102_K$. The security processor 106 may also support security operations that control data and/or command access to at least a portion of the components in the multimedia system 100. In some instances, the security processor 106 may also be utilized to support other secure operations such as key exchange, prevention of replay attacks, and/or prevention of memory attacks, for example, to enable a secure interface between the host device 104 and the slave devices $102_1, \ldots, 102_K$.

Figure 2:
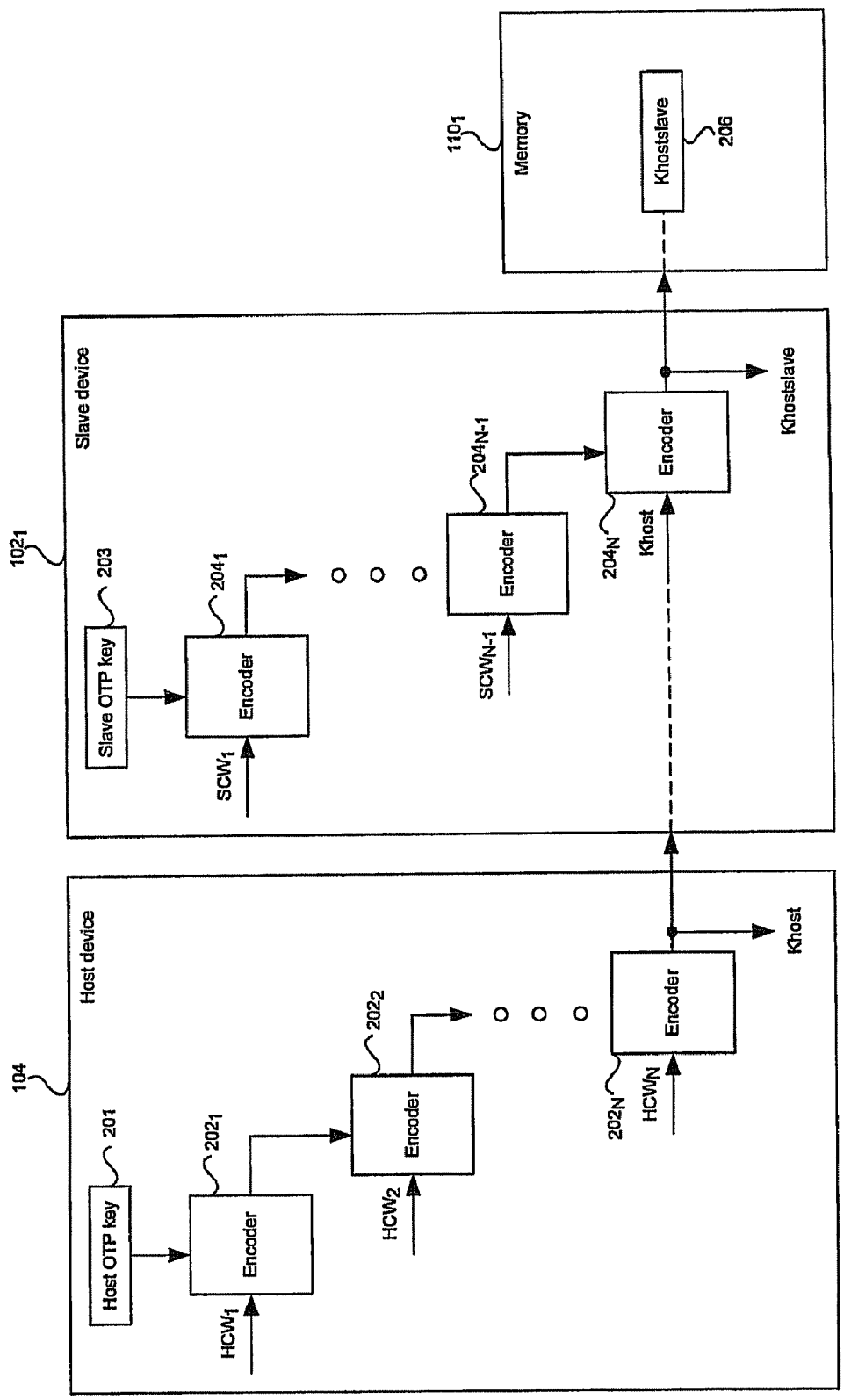
FIG. 2 is a block diagram illustrating exemplary multimedia system components for generating a common secure key utilizing on-the-fly pairing command authentication, in accordance with an embodiment of the invention.

FIG. 2 is a block diagram illustrating exemplary multimedia system components for generating a common secure key utilizing on-the-fly pairing command authentication, in accordance with an embodiment of the invention. Referring to FIG. 2, there is shown the host device 104, a slave device $102_1$ and its associated memory $110_1$. The host device 104 may comprise a host OTP root key (OTPhost) 201 that may be stored within, for example, the host OTP memory 114 as disclosed in FIG. 1. The host device 104 may also utilize a plurality of host control words $HCW_1, \ldots, HCW_N$, and a plurality of encoders $202_1, \ldots, 202_N$. The plurality of host control words $HCW_1, \ldots, HCW_N$ may correspond to hidden variables stored in an internal memory integrated within the host device 104, for example. The plurality of encoders $202_1, \ldots, 202_N$ may comprise suitable logic, circuitry, and/or code that may enable encryption operations for implementing a key ladder, such as a cipher operated in a recursive manner, for example, that may be utilized for multiple encryption of user-specific host control words with derivatives of the host OTP root key 201 to generate a final derivative value or host key, Khost. The host device 104 may receive at least one signal, which may facilitate generation of the host key, Khost, based on the host OTP root key 201 stored within the host device 104, for example. In some instances, the host key, Khost, may be stored in an internal memory integrated within the host device 104, for example. The host device 104 may also receive at least one signal to pass the host key, Khost, to the slave device $102_1$, for example.

The slave device $102_1$ may comprise a slave OTP root key (OTPslave) 203 that may be stored within, for example, the slave OTP memory $112_1$ as disclosed in FIG. 1. The slave device $102_1$ may also utilize a plurality of slave control words $SCW_1, \ldots, SCW_{N-1}$, and a plurality of encoders $204_1, \ldots, 204_N$. The plurality of slave control words $SCW_1, \ldots, SCW_{N-1}$ may correspond to hidden variables that may be stored in an internal memory integrated within the slave device $102_1$, for example. The plurality of encoders $204_1, \ldots, 204_N$ may comprise suitable logic, circuitry, and/or code that may enable a key ladder, such as a cipher operated in a recursive manner, for example, that may be utilized for multiple encryption of user-specific slave control words and the host key, Khost, with derivatives of the slave OTP root key 203 to generate a final derivative value or slave key, Khostslave. The slave device $102_a$ may receive at least one signal, which may facilitate generation of the slave key, Khostslave, based on the slave OTP root key 203 stored within the slave device $102_1$ and the passed host key, Khost. In some instances, the slave key, Khostslave, may be stored in an internal memory integrated within the slave device $102_1$, for example. The slave device $102_1$ may also receive at least one signal, which may facilitate passing of the slave key, Khostslave, to the memory $110_1$ for storage, for example. The memory $110_1$ may comprise a portion 206 for storage of the slave key, Khostslave, generated by the slave device $102_1$. Notwithstanding the exemplary embodiment disclosed in FIG. 2, on-the-fly pairing may be implemented between the host device 104 and more than one of the slave devices $102_1, \ldots, 102_K$.

The key ladder utilized by the host device 104 and/or the slave device $102_1$ may allow the OTP root key to encrypt user specified data, such as the control words, which is in turn used as the key for the next stage encryption operation. In this regard, key ladders may have more than one encryption level in order to allow a final key to have a proper crypto-distance from the OTP root key. Moreover, the key ladder may allow the final stage to go to a readable register/memory, so that software may access the final derivative key.

Figure 3:
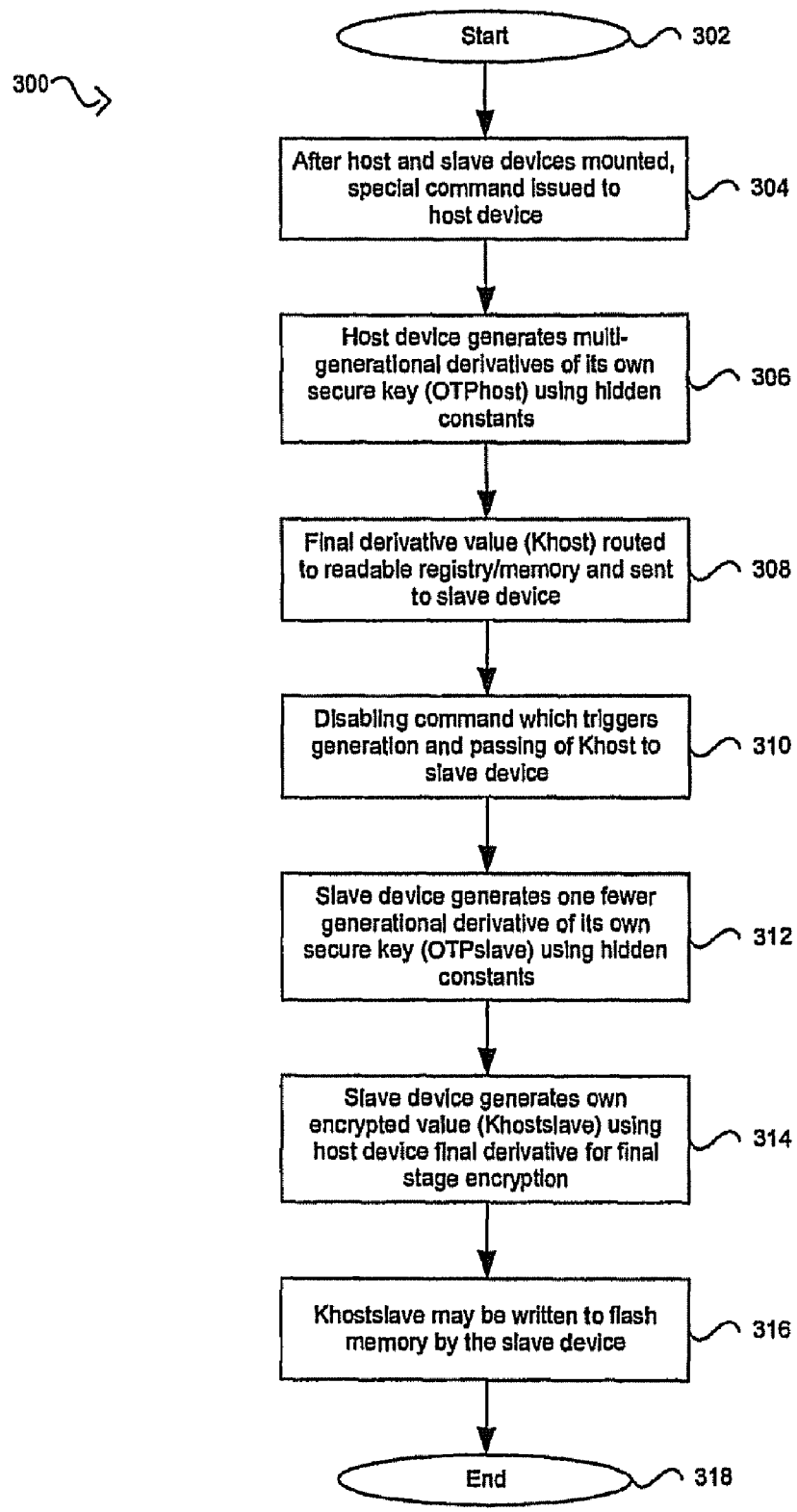
FIG. 3 is a flow diagram illustrating exemplary steps for generating a common secure key utilizing on-the-fly pairing command authentication, in accordance with an embodiment of the invention.

FIG. 3 is a flow diagram illustrating exemplary steps for generating a common secure key utilizing on-the-fly pairing command authentication, in accordance with an embodiment of the invention. Referring to FIG. 3, there is shown a flow diagram 300. In step 304, after start step 302, during manufacturing, assembling, and/or testing of at least a portion of a multimedia system 100, when the integrated circuits corresponding to the host device 104 and the slave devices $102_1, \ldots, 102_K$ have been mounted on a circuit board, a special command or signal may be communicated to the host device 104, which may facilitate generation and/or passing of the host key, Khost, to at least one of the slave devices $102_1, \ldots, 102_K$. In step 306, the special command or signal enables the host device 104 to generate multi-generational derivatives of the host OTP root key 201, OTPhost, using host control words that may be stored in the host device 104. For example, N derivatives of the OTPhost may be generated by utilizing the host control words $HCW_1, \ldots, HCW_N$ stored in, for example, an internal memory integrated within the host device 104. The final derivative value or host key, Khost, may be generated based on the following expression:

$$K_{host}=F(OTP_{host}, HCW_1, HCW_2, HCW_N),$$

where the function F( ) may correspond to the recursive cipher key ladder implemented utilizing the encoders $202_1, \ldots, 202_N$.

In step 308, the final derivative value or host key, Khost, may be routed to a readable register/memory within the host device 104 and may be sent to at least one of the slave devices $102_1, \ldots, 102_K$. In step 310, at least one command or signal may be generated to disable the host device 104 from subsequent generations and/or passings of the host key, Khost, to the slave devices $102_1, \ldots, 102_K$. In step 312, at least one command or signal may be generated to indicate to at least one of the slave devices $102_1, \ldots, 102_K$ to generate corresponding slave keys, Khostslave, based on the slave OTP root key 203, OTPslave, stored within a slave OTP memory. In this regard, N−1 derivatives of the OTPslave may be generated by utilizing the slave control words $SCW_1, SCW_{N-1}$ stored in, for example, an internal memory integrated within the slave device. The slave control words may be different than the host control words. In step 314, the slave device may generate a final derivative value or slave key, Khostslave, based on the host key, Khost, during a final stage of encryption. The final derivative value or slave key, Khostslave, may be generated based on the following expression:

$$K_{hostslave}=F(OTP_{slave}, SCW_1, SCW_2, SCW_{N-1}, Khost),$$

where the function F( ) corresponds to the recursive cipher key ladder implemented utilizing the encoders $204_1, \ldots, 204_N$. In step 316, the slave key, Khostslave, may be written to a corresponding memory, such as the memories $110_1, \ldots, 110_K$ that may be FLASH memories, for example. After step 316 the process may proceed to end step 318, for example.

The passing of host key, Khost, to the slave device may not be sufficiently secure, since it may expose the root value. However, by disabling the host device 104 as disclosed in step 310, the passing of the host key, Khost, may be performed once during manufacturing, assembling, and/or testing. In this regard, a command or signal may disable the generation and/or passing of the host key, Khost, by disabling or setting at least one OTP bit in the host OTP memory 114. The value of slave key, Khostslave, in memory may not be altered by an attacker or unauthorized user because commands to the slave devices $102_1, \ldots, 102_K$ may not be authenticated.

Figure 4:
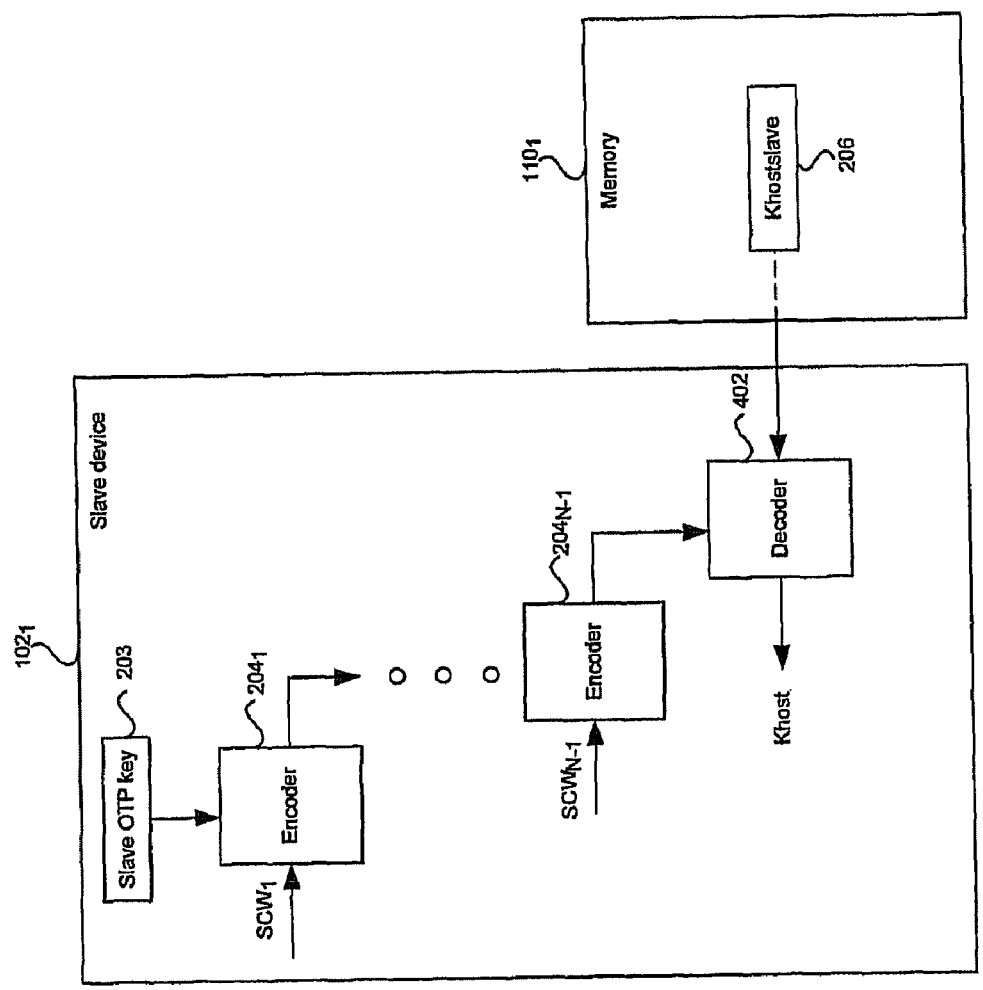
FIG. 4 is a block diagram illustrating exemplary multimedia system components for decoding a common secure key to enable on-the-fly pairing command authentication, in accordance with an embodiment of the invention.

FIG. 4 is a block diagram illustrating exemplary multimedia system components for decoding a common secure key to enable on-the-fly pairing command authentication, in accordance with an embodiment of the invention. Referring to FIG. 4, there is shown the slave device $102_1$ and the memory $110_1$ as disclosed in FIG. 2. The slave device $102_1$ may comprise the slave OTP root key (OTPslave) 203 that may be stored within, for example, the slave OTP memory $112_1$ as disclosed in FIG. 1, and a plurality of encoders $204_1, \ldots, 204_{N-1}$. The slave device $102_1$ may also comprise a decoder 402 that may comprise suitable logic, circuitry, and/or code that may enable a key ladder, such as a cipher operated in a recursive manner, for example, that may be utilized for decrypting or decoding the host key, Khost, with derivatives of the slave OTP root key 203 based on the slave key, Khostslave, stored in the portion 206 of the memory $110_1$. The decoded host key, Khost, may be utilized to decrypt and authenticate host commands that are received by the slave device $102_1$. Notwithstanding the exemplary embodiment disclosed in FIG. 4, decoding of a common secure key for on-the-fly pairing authentication operations may be performed by more than one of the slave devices $102_1, \ldots, 102_K$.

Figure 5:
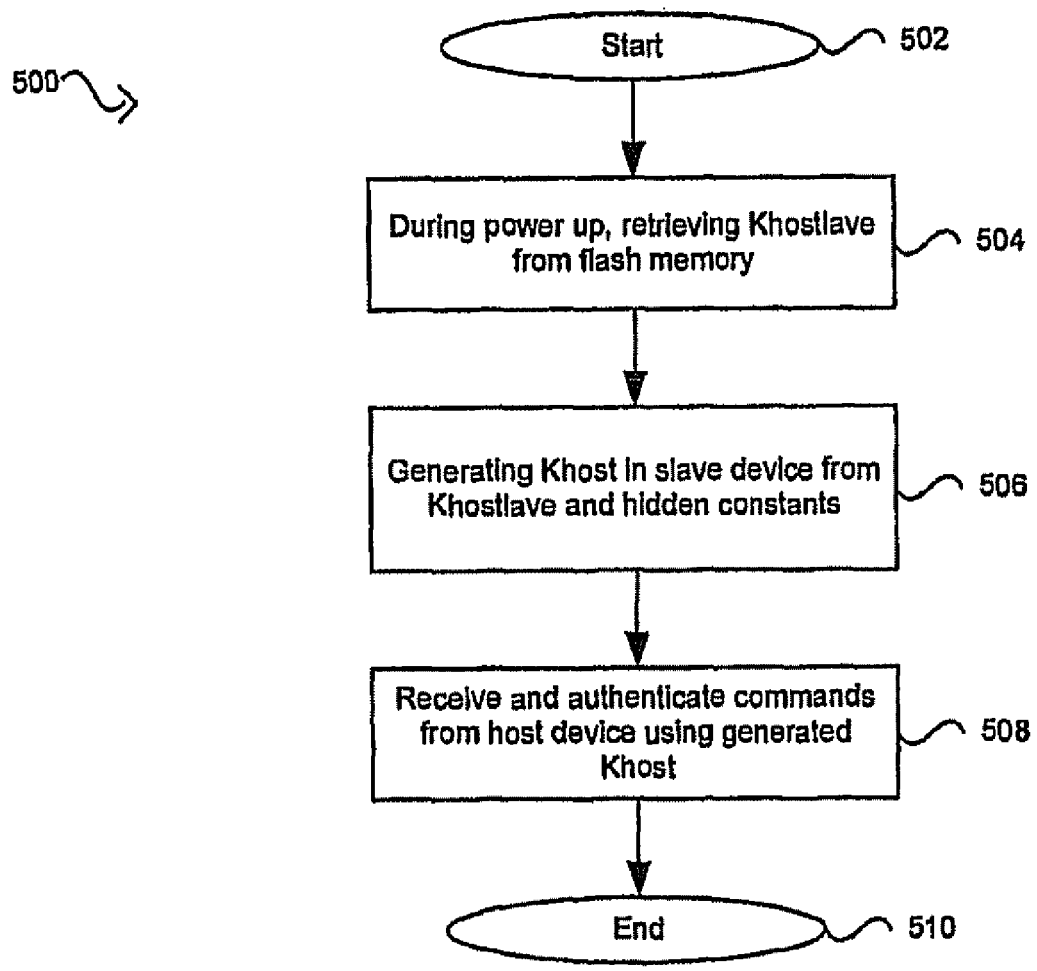
FIG. 5 is a flow diagram illustrating exemplary steps for decoding a common secure key utilizing on-the-fly pairing command authentication, in accordance with an embodiment of the invention.

FIG. 5 is a flow diagram illustrating exemplary steps for decoding a common secure key utilizing on-the-fly pairing command authentication, in accordance with an embodiment of the invention. Referring to FIG. 5, there is shown a flow diagram 500. In step 504, after start step 502, when the multimedia system 100 is powered up, a slave device, such as the slave device $102_1$, for example, may read the slave key, Khostslave, from the corresponding memory, which may be a FLASH memory, for example. In step 506, the slave device may then utilize hidden constants, such as the slave control words $SCW_1, SCW_2, \ldots, SCW_{N-1}$, for example, to obtain the host key, Khost, by performing a decryption operation during the final stage of the recursive cipher key ladder. In step 508, commands received from the host device, such as the host device 104, may be authenticated since the host key, Khost, may be known to both the host and slave devices and the host key, Khost, has not been exposed since the passing to the slave device during manufacturing, assembling, and/or testing of at least a portion of a multimedia system 100 as disclosed in FIGS. 3-4.

In addition to command authentication as a mechanism for ensuring secure communication between devices via a common interface, others techniques may also be utilized to further ensure a secure command interface. For example, a key exchange operation and/or a replay attack protection operation may be utilized in addition to on-the-fly pairing command authentication to further secure a command interface between a host device and a slave device.

In a key exchange operation, for example, a key index may be exchanged or communicated between the host device and the slave device. The key index may be utilized to select a common or master key from a key table that may be common to the host device and to the slave device. In this regard, the host and slave devices utilize the key index to obtain a key that may be common to both devices without exposing the actual key value. While exchanging a key index may be vulnerable in instances when a chip containing the appropriate key table is obtained by an unauthorized user, when this approach is combined with a command authentication scheme, such as on-the-fly pairing, for example, and/or with other operations, such as replay attack protection, for example, then the use of a master or common key obtained via the key index may further secure a command interface and the appropriate host device may be authenticated as an authorized source for communicating commands to the slave device.

In a replay attacks, for example, an attacker or unauthorized user may be tracking the commands being sent to the slave device and when a particular command produces a desired result from the slave device, the attacker or unauthorized user may remember the command and may later issue a similar sequence in order to achieve the same result from the slave device. Providing mechanisms to reduce or eliminate the likelihood of a replay attack may also be utilized to further secure a command interface.

Figure 6:
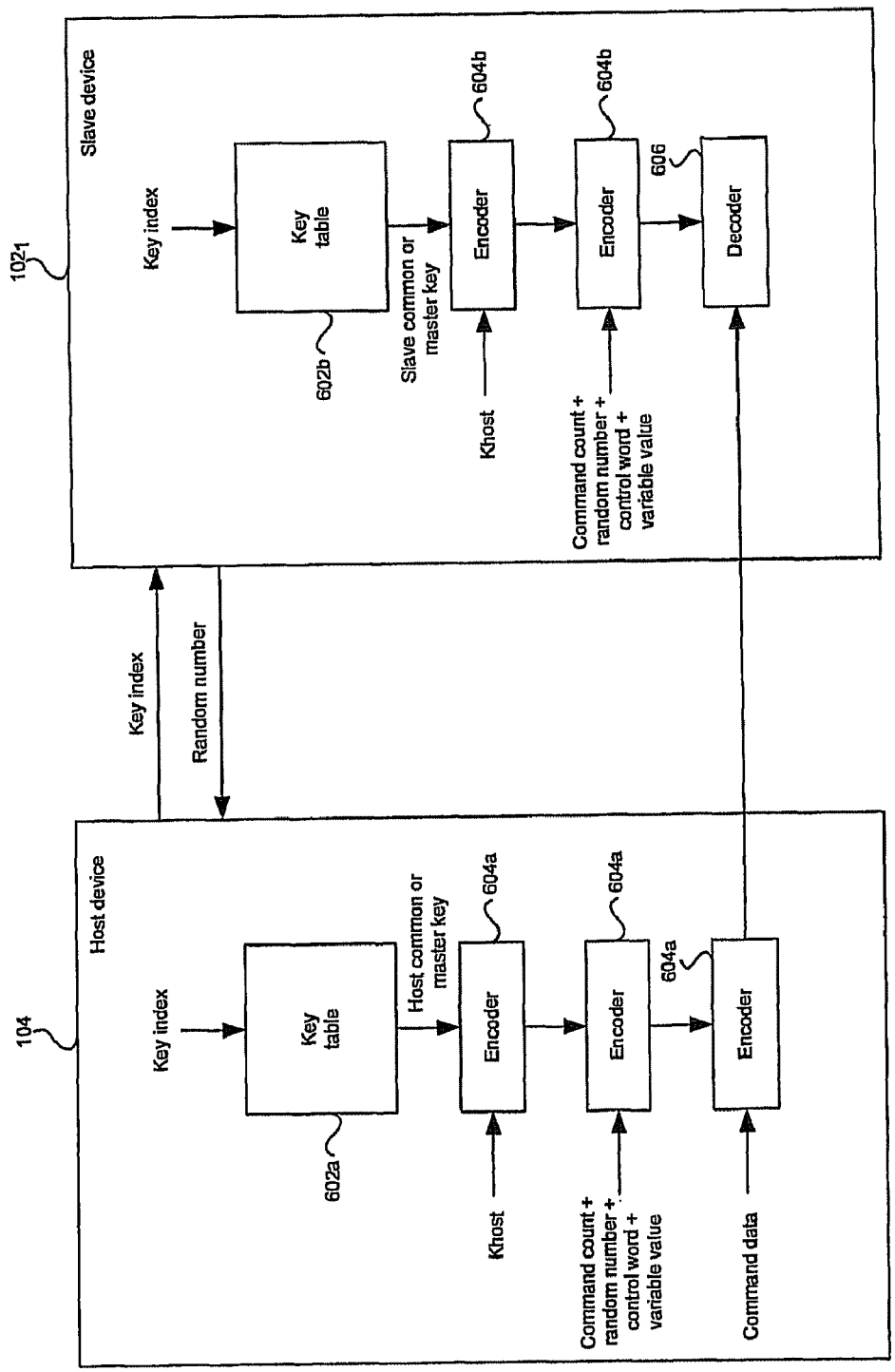
FIG. 6 is a block diagram illustrating an exemplary multimedia system that supports on-the-fly pairing for command authentication, key exchange operations, and/or replay attack protection, in accordance with an embodiment of the invention.

FIG. 6 is a block diagram illustrating an exemplary multimedia system that supports on-the-fly pairing for command authentication, key exchange operations, and/or replay attack protection, in accordance with an embodiment of the invention. Referring to FIG. 6, there is shown a host device 104 and a slave device $102_1$ that may be comprised within the multimedia system 100 disclosed in FIG. 1. The host device 104 may comprise a host key table 602a and plurality of encoders 604a. The slave device 1021 may comprise a slave key table 602b, a plurality of encoders 604b, and a decoder 606.

The host device 104 may comprise suitable logic, circuitry, and/or code that may enable generation of a key index for selecting a host common or master key from the key table 602a. The host device 104 may also enable communicating the key index to a slave device, such as the slave device $102_1$ as disclosed in FIG. 6. The key table 602a may comprise suitable logic, circuitry, and/or code that may enable storing at least one common or master key that may be utilized by the host device 104 for encrypting a host command to be communicated to the slave device $102_1$. The key table 602a may be implemented in at least a portion of an internal memory integrated within the host device 104.

The encoders 604a may comprise suitable logic, circuitry, and/or code that may enable encoding or encrypting data based on a key ladder, such as a cipher operated in a recursive manner, for encrypting a host command to be communicated to the slave device $102_1$. In this regard, an encoder 604a may be utilized to encode the host key, Khost, generated by the host device 104 based on the host master key selected from the key table 602a. Another encoder 604a may be utilized to encode, based on the encoded host key, a control word that results from a combination and/or merging of data that may comprise of a command count, a random number received by the host device 104 from the slave device $102_1$, at least one host control word stored within a portion of a memory integrated within the host device 104, and a variable value generated by the host device 104. The command count may correspond to a value or number associated with the order and/or sequence in which commands are issued by the host device 104. Another encoder 604a may be utilized to encode a host command based on the results from encoding the combined and/or merged data. At least a portion of the intermediate results of the host command encoding operation, the command count, the random number, the key index, the control words, and/or the variable value may be stored in an internal memory integrated within the host device 104, for example.

Notwithstanding the embodiment of the invention disclosed in FIG. 6, a plurality of encoders may be utilized to obtain generational derivatives of the master key in order to encrypt or encode the host command to be communicated to the slave device $102_1$. The host device 104 may enable communicating the encrypted host command to the slave device $102_1$ via, for example, the bus interface 108 disclosed in FIG. 1.

The slave device $102_1$ may comprise suitable logic, circuitry, and/or code that may enable receiving a key index communicated from the host device 104 for selecting a slave common or master key from the key table 602b. The key table 602b may comprise suitable logic, circuitry, and/or code that may enable storing at least one common or master key that may be utilized by the slave device $102_1$ for decrypting a host command communicated from the host device 104. The key table 602b may be implemented in at least a portion of a memory integrated within the slave device $102_1$. In this regard, the contents and/or indexing of the contents comprised within the key table 602b may be the same or substantially similar to the contents and/or indexing of the contents comprised within the key table 602a in the host device 104. The slave device $102_1$ may also enable generating at least one random number that may be communicated to the host device 104 via, for example, the bust interface 108 disclosed in FIG. 1.

The encoders 604b may comprise suitable logic, circuitry, and/or code that may enable encoding or encrypting data based on a key ladder, such as a cipher operated in a recursive manner, for decrypting a host command communicated from the host device 104. In this regard, an encoder 604b may be utilized to encode the host key, Khost, based on the slave master key selected from the key table 602b. The slave device $102_1$ may generate the host key, Khost, by retrieving from memory and decoding the slave key, Khostslave, generated via an on-the-fly pairing command authentication operation, for example. Another encoder 604b may be utilized to encode, based on the encoded host key, a control word that results from a combination and/or merging of data that may comprise of a command count, the random number generated by the slave device $102_1$, at least one slave control word stored within a portion of a memory integrated within the slave device $102_1$, and a variable value generated by the slave device $102_1$. The command count may correspond to a value or number kept by the slave device $102_1$ and associated with the order and/or sequence in which commands are issued by the host device 104. The at least one slave control word and the variable value may correspond to the at least one host control word and variable value utilized by the host device 104 for encrypting the host command. The decoder 606 may comprise suitable logic, circuitry, and/or code that may enable decrypting the encrypted host command based on the results from encoding the combined and/or merged data. At least a portion of the intermediate results of the host command decoding or decrypting operation, the command count, the random number, the key index, the control words, and/or the variable value may be stored in an internal memory integrated within the slave device $102_1$, for example.

Figure 7:
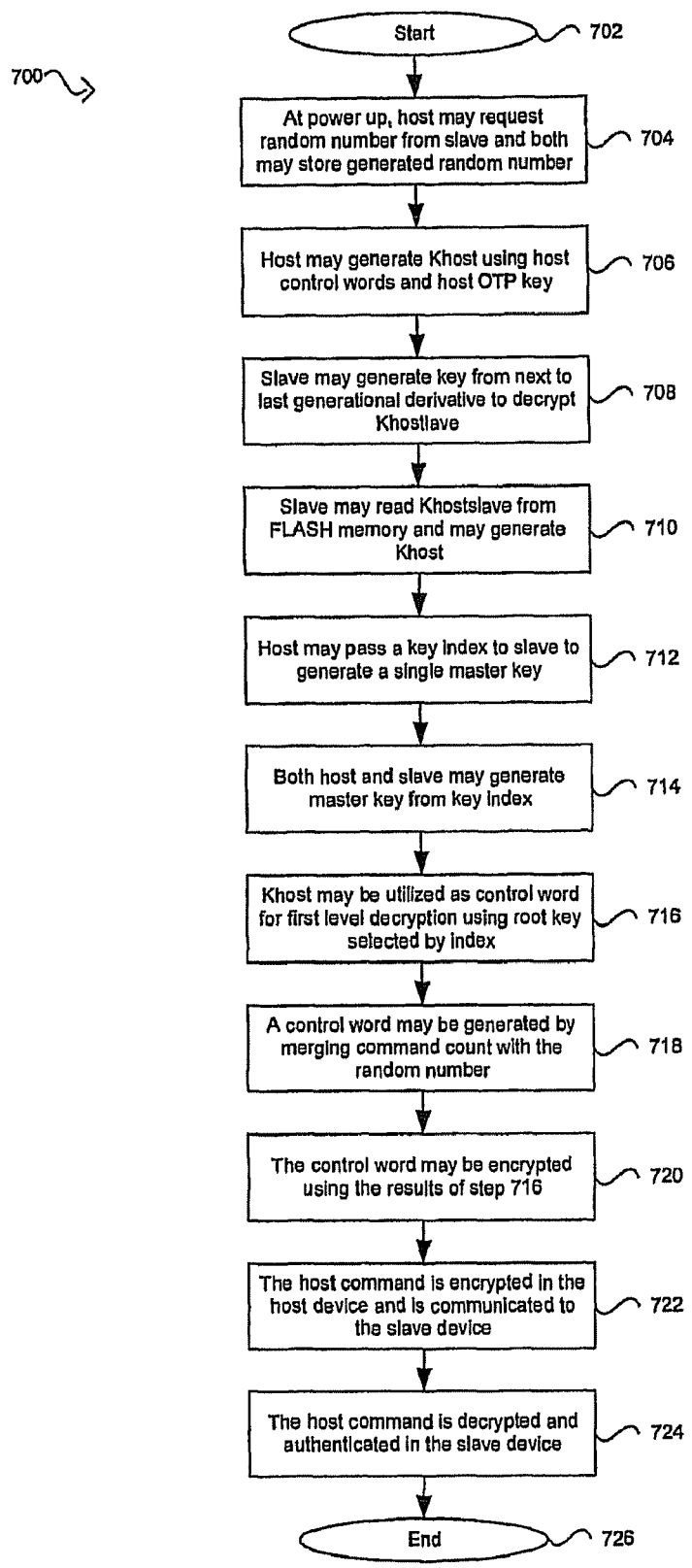
FIG. 7 is a flow diagram illustrating exemplary steps for the operation of the multimedia system in FIG. 6, in accordance with an embodiment of the invention.

Notwithstanding the embodiment of the invention disclosed in FIG. 6, a plurality of encoders may be utilized to obtain generational derivatives of the master key in order to decrypt or decode the encrypted host command received by the slave device 102₁. FIG. 7 is a flow diagram illustrating exemplary steps for the operation of the multimedia system in FIG. 6, in accordance with an embodiment of the invention.

FIG. 7 is a flow diagram illustrating exemplary steps for the operation of the multimedia system in FIG. 6, in accordance with an embodiment of the invention. Referring to FIG. 7, there is shown a flow diagram 700. In step 704, after start step 702, when the multimedia system 100 is powered up, the host device 104 may request a random number from a slave device, such as the slave device 102₁, for example. The slave device 102₁ may generate the random number and may communicate the generated random number to the host device 104 via a bus interface, such as the bus interface 108, for example. The host device 104 and the slave device 102₁ may store the random number in memory, such as memory that may be integrated within the host device 104 and the slave device 102₁ respectively, for example.

In step 706, the host device 104 may generate the host key, Khost, based on multi-generational derivatives of the host OTP root key 201, OTPhost, using host control words HCW₁, . . . , HCW_N as disclosed in FIGS. 2-3 or may retrieve the host key, Khost, stored in a local memory within the host device 104 when the ability to generate the host key, Khost, has been disabled. In step 708, the slave device 102₁ may generate a pre-key in the next to last stage of a recursive cipher key ladder based on the slave OTP root key 203, OTPslave, stored within a slave OTP memory and hidden constants, such as the slave control words SCW₁, . . . , SCW_{N-1}. In step 710, the slave device 102₁ may read the slave key, Khostslave, from the corresponding memory, which may be a FLASH memory, for example, and may utilize the pre-key generated in step 708 to obtain the host key, Khost, by performing a decryption operation during the final stage of a recursive cipher key ladder.

In step 712, the host device 104 may generate a key index and may communicate the key index to the slave device 102₁ via the bus interface 108. In step 714, the host device 104 and the slave device 102₁ may each select a master or common key from the key tables 602a and 602b, respectively, based on the key index. In step 716, a first level of encryption may be performed in the host device 104 and the slave device 102₁ based on the selected master or common keys and on the shared host key, Khost. In step 718, a control word comprising at least a portion of the command count, the random number, at least one control word, and a variable value may be generated in the host device 104 and in the slave device 102₁.

In step 720, the control words generated in step 718 may be encrypted in the host device 104 and in the slave device 102₁ respectively by utilizing the results from step 716. In step 722, the host device 104 may encrypt the host command based on the results from step 720 generated within the host device 104. The host device 104 may communicate the encrypted host command to the slave device 102₁ via the bus interface 108. In step 724, the slave device 102₁ may decrypt the encrypted host command based on the results from step 720 generated in the slave device 102₁. When the encrypted host command is properly decrypted and understood by the slave device 102₁, then the slave device 102₁ may authenticate that the command is received from an authorized source. Otherwise, the command received was not from an authorized source. After step 724, the process may proceed to end step 726.

Since the host device 104 and the slave device 102₁ utilize the same and/or similar values in their corresponding recursive cipher key ladders, the slave device 102₁ may understand the values encrypted by the host device 104. In this regard, the approach described herein may ensure that commands may originate from one authorized host device and be decrypted by the appropriate slave device. Moreover, the exchange of a random number, the random number may be generated by either the host device 104 or by the corresponding slave device being paired with the host device 104. In this regard, the exchange of the random number need not be a secure exchange.

After the multimedia system 100 is powered up, the host device 104 may keep track of a value associated with command count. The value may be incremented when a command or when certain commands are issued or generated by the host device 104. When the host device 104 is ready to generate a command, the host device 104 may add the command count value to the random number in order to generate a control word for the host command encryption process. In some instances, bit interleaving may be utilized when encrypting the host command. The slave device 102₁ may also keep track of a value for the command count and may also have access to the random number. After decrypting the host command, the slave device 102₁ may accept those commands that have the correct random number and command count value. The slave device 102₁ may reject commands that have incorrect random number and command count value. This approach may ensure that when an unauthorized user re-issues a command that was previously generated, the command counter value may not be correct and the slave device 102₁ may reject the command.

In some instances, the command count for the host device 104 and for a slave device may not be synchronized. In this regard, the slave device may be enabled for acceptance of host commands in which the command count may be higher than the command count expected by the slave device. This approach may allow the slave device to accept a host command when the slave device missed a previously issued host command and the expected command count by the slave device had a lower value than the command count encrypted within the received host command. However, when the command count received by the slave device has a value that is lower than the expected command count value, then the host command may be rejected since it may be a replay attack.

In addition to command authentication, key exchange, and/or replay attack protection mechanisms, memory protection mechanisms may also be utilized to ensure the security of a multimedia system, such as the multimedia system 100 disclosed in FIG. 1. Memory protection may be utilized since a slave device may store intermediate results from encryption and/or decryption operations in internal memory, such as the internal memories 116₁, . . . , 116_K disclosed in FIG. 1. In this regard, to maintain a system secure, various mechanisms that prevent unauthorized users from accessing the slave device's internal memory may be utilized.

Figure 8A:
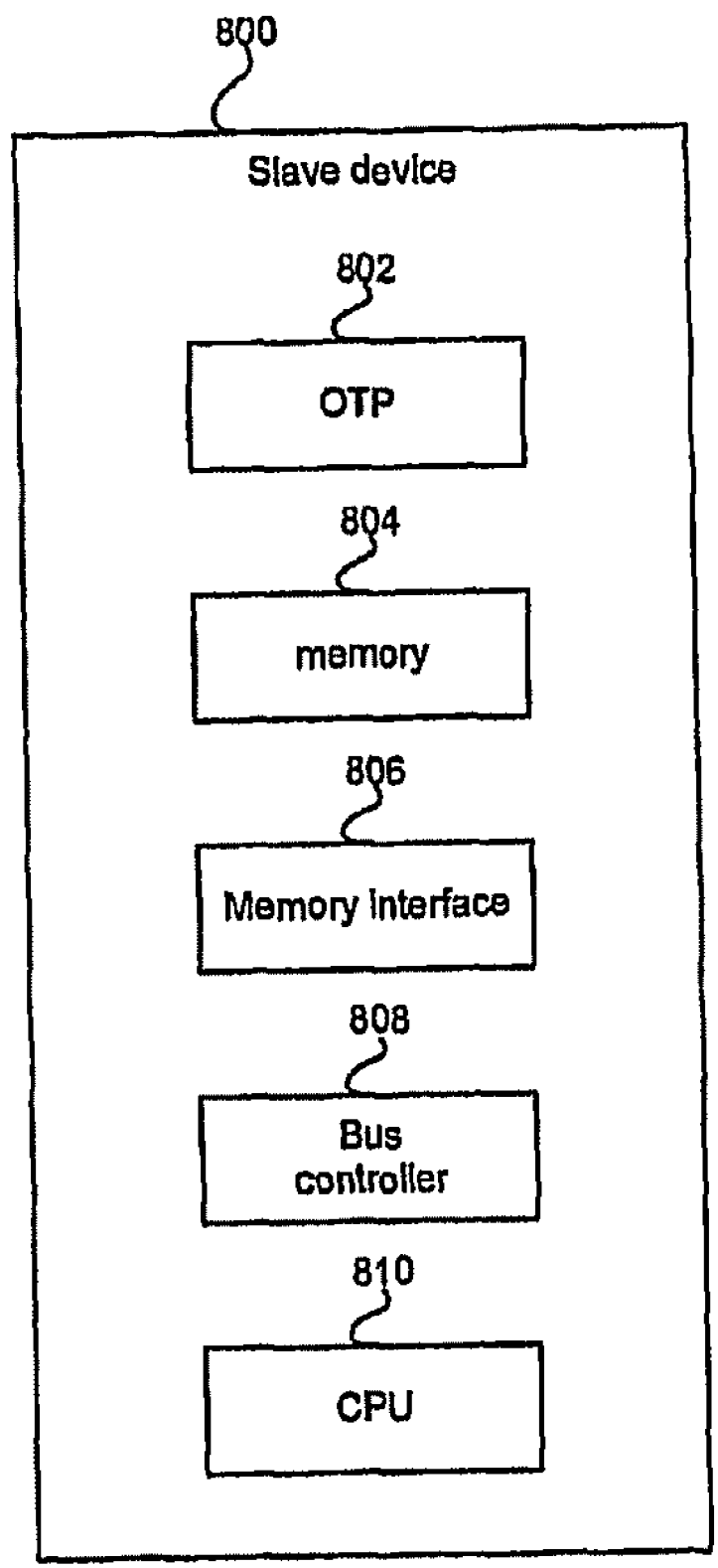
FIG. 8A is a block diagram illustrating an exemplary slave device architecture for memory attack protection, in accordance with an embodiment of the invention.

FIG. 8A is a block diagram illustrating an exemplary slave device architecture for memory attack protection, in accordance with an embodiment of the invention. Referring to FIG. 8A, there is shown a slave device 800 that may comprise a slave one-time-programmable (OTP) memory 802, a memory 804, a memory interface 806, a bus controller 808, and a central processing unit (CPU) 810. The slave OTP memory 802 may be the same or substantially similar to the slave OTP memories 112₁, . . . , 112_K disclosed in FIG. 1. In this regard, the slave OTP memory 802 may be enable storage of the slave OTP root key (OTPslave) 203 disclosed in FIG. 2 for use in a first stage of a key ladder implemented as a cipher operated in a recursive manner, for example. The memory 804 may be the same or substantially similar to the internal memories $116_1, \ldots, 116_K$ disclosed in FIG. 1. In this regard, the memory 804 may enable storage of information, such as intermediate results, internal variables, host commands, and/or initialization information, for example, that may be utilized for supporting secure communication between the slave device 800 and a host device, such as the host device 104.

The memory interface 806 may comprise suitable logic, circuitry, and/or code that may enable a particular portion or region of the memory 804 to be accessed. The bus controller 808 may comprise suitable logic, circuitry, and/or code that may enable that a portion of the memory 804 may only be accessed from within the slave device 800. The bus controller 808 may also be utilized to ensure that bus masters may not gain access to internal registers that may part of the memory 804, for example. The central processing unit (CPU) 810 may comprise suitable logic, circuitry, and/or code that may enable processing data and/or controlling operations within the slave device 800. The CPU 810 may utilize information stored within the memory 804, for example. In this regard, the CPU 810 may have access to at least a portion of the memory 804.

Figure 8B:
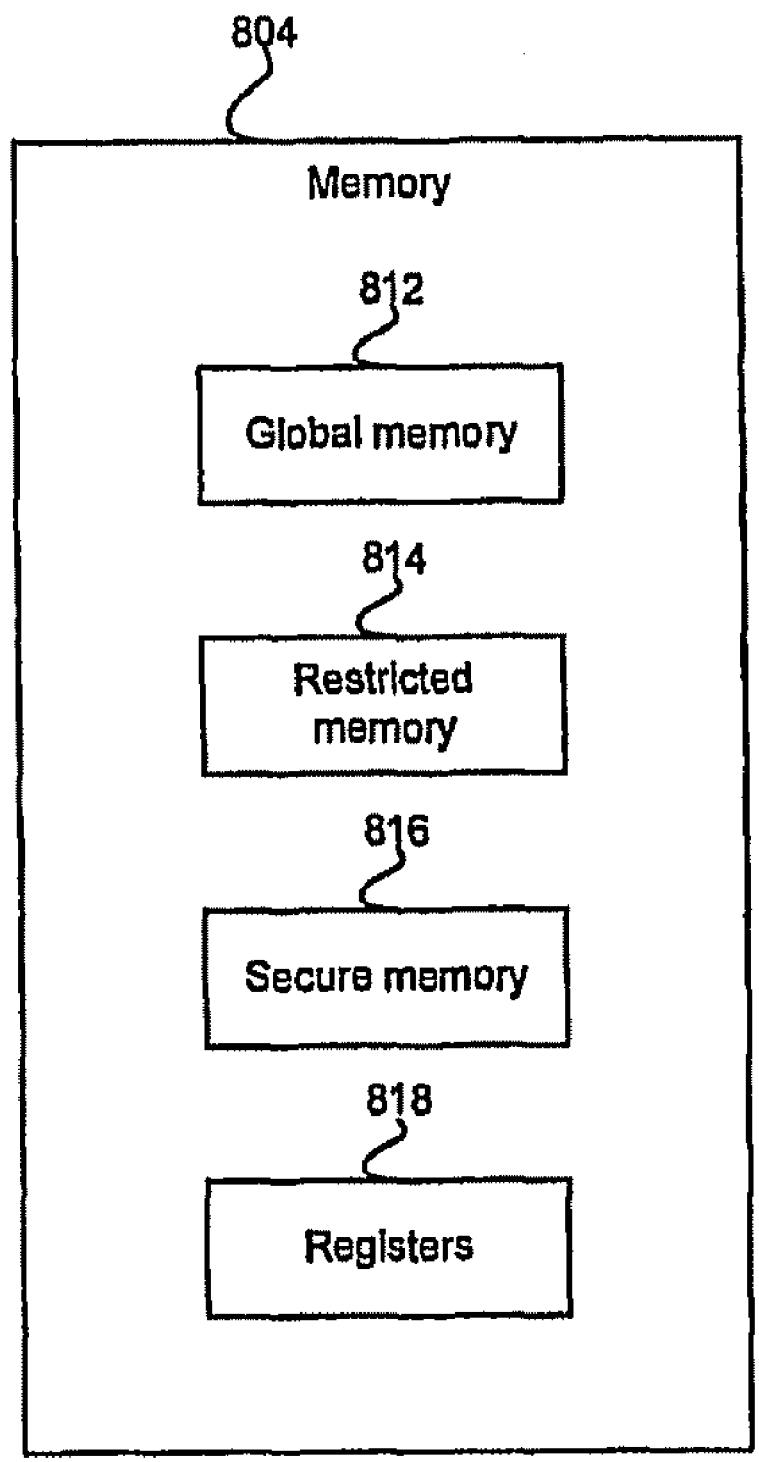
FIG. 8B is a block diagram illustrating an exemplary internal memory configuration within a slave device architecture for memory attack protection, in accordance with an embodiment of the invention.

FIG. 8B is a block diagram illustrating an exemplary internal memory configuration within a slave device architecture for memory attack protection, in accordance with an embodiment of the invention. Referring to FIG. 8B, there is shown the memory 804 disclosed in FIG. 8A. The memory 804 may be configured into a plurality of portions, regions, or windows, for example. Memory windows may be utilized to control or prevent certain users, in some instances even an authorized user, from accessing certain portions of the memory 804. In this regard, the memory 804 may comprise a first memory portion that may be referred to as a global memory region 812, a second memory portion that may be referred to as a restricted memory region 814, a third memory portion that may be referred to as a secure memory region 816, and a fourth memory portion that may be referred to as internal registers region 818. Notwithstanding the memory 804 configuration disclosed in FIG. 8B, the memory 804 may be configured and/or partitioned into a larger or smaller number of memory portions or regions, for example.

The global memory region 812 may comprise suitable logic, circuitry, and/or code that may enable a user external to a slave device comprising the memory 804 to read and/or write data to this portion of the memory 804 via a common bus, such as the bus interface 108 disclosed in FIG. 1. For example, the global memory region 812 within may be accessible over a peripheral component interconnect (PCI) bus communicatively coupled to the slave device 800 and to a processing core, such as the CPU 810 within the slave device 800. The global memory region 812 may be utilized to store encrypted data, such as encrypted audio and/or video data, and commands, such as commands sent from a host device, for example. The global memory region 812 may be made visible on a PCI bus because the information stored in it is generally encrypted.

The restricted memory region 814 may comprise suitable logic, circuitry, and/or code that may enable storage of information that may not be accessible via a bus interface, such as the bus interface 108, but that may be accessible by a processing core or central processing unit, such as the CPU 810, within the slave device 800. The restricted memory region 814 may be utilized to store information such as decompressed video and/or audio data and decrypted commands. Decrypted host commands, such as initialization code or processor code, for example, may be stored in the restricted memory region 814 and may be utilized by the slave device during power up operations may be stored in the restricted memory region 814. The decompressed video and/or audio data may have been decrypted before storage in the restricted memory region 814. In some instances, the restricted memory region 814 may be locked out from further access after the initialization operations in the slave device are completed.

The secure memory region 816 may comprise suitable logic, circuitry, and/or code that may enable storage of internal variables, such as control words, for example. The secure memory region 816 may also be utilized for storage of intermediate data, such as intermediate results from operations associated with secure communication between the slave device and a host device and/or intermediate data from the processing of audio and/or video data, for example. In this regard, components or devices external to the slave device 800 may not access the secure memory region 816, for example. The secure memory region 816 may not be accessible over a common bus interface, such as a PCI bus, or by the CPU 810 within the slave device 800. The secure memory region 816 may store information that may be utilized by hardware and/or sub-processors within the slave device 800. For example, the hardware and/or subprocessors may be associated with processing, such as compression and/or decompression, for example, of video and/or audio data. The memory interface 806 and/or the bus controller 808 may be utilized to control the access to the secure memory region 816.

The internal registers region 818 may comprise suitable logic, circuitry, and/or code that may enable storage of information that may be utilized by the slave device 800 and that may not be accessed over a common bus, such as the bus interface 108, for example. In some instances, the internal registers region 818 may be implemented separate from the memory 804 and within the slave device 800. The bus controller 808 may be utilized to ensure that bus masters may not have access to the internal registers region 818.

Each of the memory region boundaries in the memory 804 may be set up or configured by the host device by sending at least one secure host command to the slave device 800 as disclosed. Within the slave device 800, the bus controller 808 and the memory interface 806 may work together to ensure that, for example, only the slave device 800 may access the region comprising the secure memory region 816. Moreover, the bus controller 808 may also ensure that a bus master may not gain access to the region comprising the internal registers region 818.

The approach disclosed herein may enable protection of a slave device's internal memory from exposure to unauthorized users. Intermediate results from encryption and/or decryption operations performed by the slave device that are stored in the internal memory may be protected from memory attacks enabling secure communication interfaces between host and slave device in multimedia systems.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for secure communication in a device, the method comprising:
   receiving by a slave device, a host command from a host device coupled to said slave device via a communication link, wherein:
      said slave device is operable to configure a secure interface for communicating with said host device;
      said secure interface is configured over said communication link; and
      said host command is received via said secure interface;
   configuring a plurality of memory regions integrated within said slave device based on said received host command; and
   storing information into said configured plurality of memory regions, wherein said stored information is used to authenticate subsequent host commands communicated from said host device to said slave device.

2. The method according to claim 1, comprising configuring a first of said plurality of memory regions to enable storage of one or more of the following: said at least one host command before decryption, said subsequent host commands from said host device before decryption, and data received from said host device before decryption.

3. The method according to claim 1, comprising configuring a second of said plurality of memory regions to enable storage of one or more of the following:
   said at least one host command after decryption, said subsequent host commands from said host device after decryption, and data received from said host device after decryption.

4. The method according to claim 1, comprising configuring a third of said plurality of memory regions to enable storage of one or more of the following: internal variables, intermediate results from operations associated with authentication of said at least one host command and said subsequent host commands, and intermediate results from operations associated with data received from said host device.

5. The method according to claim 4, comprising controlling access to said configured third of said plurality of memory regions utilizing one or more of the following: a bus controller integrated within said slave device and a memory interface integrated within said slave device.

6. The method according to claim 1, comprising configuring a fourth of said plurality of memory regions to comprise internal registers.

7. The method according to claim 6, comprising controlling access to said configured fourth of said plurality of memory regions utilizing a bus controller integrated within said slave device.

8. The method according to claim 1, wherein at least one of said plurality of memory regions is not accessible by said host device.

9. A system for secure communication in a device, the system comprising:
   a slave device that is coupled to a host device via a communication link, said slave device being operable to:
      configure a secure interface for communicating with said host device, wherein said secure interface is configured over said communication;
      receive a host command from said host device, wherein said host command is received via said secure interface;
      configure a plurality of memory regions integrated within said slave device based on said received host command; and
   store information into said configured plurality of memory regions, wherein said stored information is used to authenticate subsequent host commands communicated from said host device to said slave device.

10. The system according to claim 9, wherein said slave device enables configuration of a first of said plurality of memory regions to enable storage of one or more of the following: said at least one host command before decryption, said subsequent host commands from said host device before decryption, and data received from said host device before decryption.

11. The system according to claim 9, wherein said slave device enables configuration of a second of said plurality of memory regions to enable storage of one or more of the following: said at least one host command after decryption, said subsequent host commands from said host device after decryption, and data received from said host device after decryption.

12. The system according to claim 9, wherein said slave device enables configuration of a third of said plurality of memory regions to enable storage of one or more of the following: internal variables, intermediate results from operations associated with authentication of said at least one host command and said subsequent host commands, and intermediate results from operations associated with data received from said host device.

13. The system according to claim 12, wherein said slave device enables access control to said configured third of said plurality of memory regions utilizing one or more of the following: a bus controller integrated within said slave device and a memory interface integrated within said slave device.

14. The system according to claim 9, wherein said slave device enables configuration of a fourth of said plurality of memory regions to comprise internal registers.

15. The system according to claim 14, wherein said slave device enables access control to said configured fourth of said plurality of memory regions utilizing a bus controller integrated within said slave device.

16. The system according to claim 9, wherein at least one of said plurality of memory regions is not accessible by said host device.

17. A multimedia system, comprising:
a security processor that manages security operations in the multimedia system;
a bus subsystem that enables communication of data among components of the multimedia system;
a host device that is operable to control and/or manage operations of at least some of the components of the multimedia system; and
a slave device that is controlled by said host device, said slave device being operable to perform one or more dedicated functions in the multimedia system, said dedicated functions comprising processing audio and/or video data, and said slave device comprising an internal memory for use during said dedicated functions, wherein:
  said slave device and said host device establish, during said security operations in the multimedia system, a secure interface for secure communication via said bus subsystem; and
  said slave device configures, based on a host command received from said host device via said secure interface, a plurality of memory regions within said internal memory.

18. The multimedia system of claim 17, wherein said slave device restricts access to at least one of said plurality of memory regions.

19. The multimedia system of claim 17, wherein said slave device stores into said configured plurality of memory regions, information that is used in authenticating subsequent host commands received from said host device.

20. The multimedia system of claim 17, wherein said secure interface is configured to support one or more of on-the-fly pairing command authentication and one-time-programmable (OTP) key programming command authentication.

* * * * *